MASTER RADIO RECEIVER WITH AUDIO DISTRIBUTION SYSTEM

Filed Jan. 22, 1951 2 Sheets-Sheet 1

INVENTORS:
WENDELL S. FLETCHER
ERNEST W. HOLLAND
BY THEIR ATTORNEYS
HARRIS, KIECH, FOSTER & HARRIS
By [signature]

MASTER RADIO RECEIVER WITH AUDIO DISTRIBUTION SYSTEM

Filed Jan. 22, 1951 2 Sheets-Sheet 2

INVENTORS:
WENDELL S. FLETCHER
ERNEST W. HOLLAND
BY THEIR ATTORNEYS
HARRIS, KIECH, FOSTER & HARRIS
By [signature]

2,798,151

MASTER RADIO RECEIVER WITH AUDIO DISTRIBUTION SYSTEM

Wendell S. Fletcher, South Pasadena, and Ernest W. Holland, Temple City, Calif.; said Holland assignor to said Fletcher Application January 22, 1951, Serial No. 207,172

9 Claims. (Cl. 250—20)

This application is a continuation-in-part of our now pending application for United States Letters Patent for a Radio Circuit, Serial No. 685,894, filed on July 24, 1946, now abandoned.

Our invention relates to multiple unit communication receiver systems, and more particularly to a system adapted for radio or television program distribution in hotels, homes and other buildings in which it is desired to receive a plurality of programs and to distribute such programs to various reproducers. In the field of commercial radio, a reproducer may be designated as a portion of the last stages of a radio network and including the loudspeaker. In the field of commercial television, a reproducer may be designated as a portion of the last stages of the sound channel network including the loudspeaker and a portion of the last stages of the video channel network including the cathode-ray tube or viewing screen.

A radio or television receiver system of the type to which the invention particularly pertains comprises a plurality of differently tuned radio frequency receiver units arranged at a master location and a plurality of reproducer units disposed at spaced, remote, listening or viewing locations, such as in different rooms of a hotel, apartment house, or home.

One of the objects of the invention is to provide a multiple unit communication receiver system with improved means for distributing intelligence from the receiver units to the reproducer units.

Another object of our invention is to provide a multiple unit radio or television receiver system with improved means for distributing programs from the receiver unit to the reproducer unit or units.

Another object of our invention is to provide an improved multiple unit radio or television receiving system with means for selectively connecting any of the reproducer units to the output of any of the receiver units without changing the output level of any audio frequency reproducer unit or any video-frequency reproducer unit already connected thereto.

Another object of the invention is to provide a multiple unit radio receiver system with a radio frequency receiver unit having an effectively low output impedance so as to permit the connection of any number of audio frequency reproducer units thereto in parallel without disturbing the intensity level in any audio frequency reproducer unit already connected thereto.

Another object of the invention is to provide a multiple unit television receiver system with a radio frequency unit having an effectively low output impedance so as to permit the connection of any number of reproducer units thereto in parallel without disturbing the output of any reproducer units already connected thereto whereby the intensity level of the sound channel and the contrast level of the video channel may be maintained substantially constant.

A further object of our invention is to provide a multiple unit television receiver having a plurality of differently tuned receiver units including means to connect the output thereof to any number of a plurality of television reproducer units whereby any of the reproducer units may be connected or disconnected without disturbing the intensity level in any reproducer unit already connected thereto.

Another object of the invention is to provide an improved multiple unit radio or television receiving system having receiver units and reproducer units with a signal distribution system which includes only a single signal conductor leading from any receiver unit to any reproducer unit.

Still another object of the invention is to provide a multiple unit radio or television receiver system which is provided with a power supply associated with the receiver units and a plurality of power supplies associated with a plurality of reproducer units, and which is provided with an improved switching system including a master switch associated with the first power supply and including a plurality of individual switches respectively associated with the second power supplies for controlling the operation of the power supplies.

A further object of our invention is to provide a multiple unit radio or television receiver having a plurality of differently tuned radio frequency receiver units and a plurality of reproducer units with improved means for controlling the volume and/or intensity produced at each reproducer unit.

A still further object of our invention is to provide a multiple unit radio receiver having a plurality of differently tuned radio receiver units with means for setting the signal level appearing at the output of each of the receiver units at the same level.

The foregoing and other objects of the invention, together with numerous advantages thereof and various novel features thereof, will appear from the following specification and the accompanying drawings, which are for the purpose of illustration only, and in which.

Figure 1:
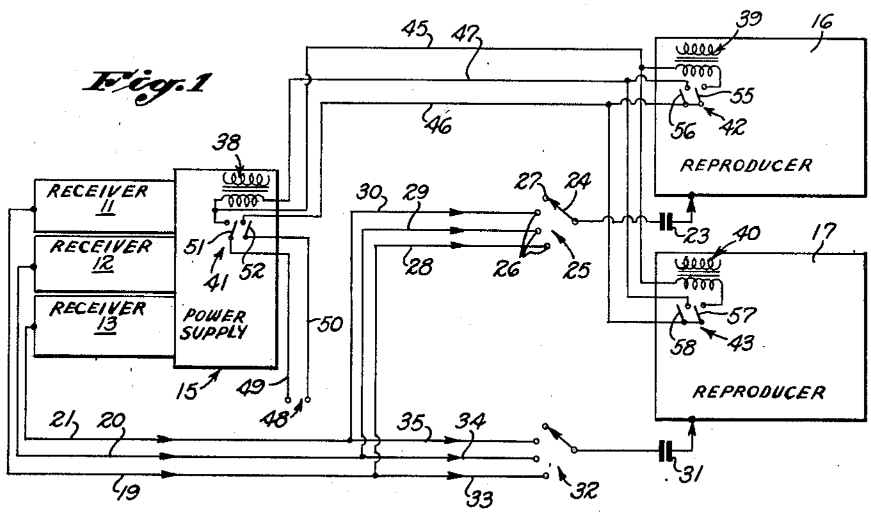
Fig. 1 is a schematic diagram of a multiple unit communication receiver system or a radio or television receiver and program distribution system embodying the features of the invention.

Referring to Fig. 1, there is illustrated a communication receiver and intelligence distribution system that may be adapted for use in the field of radio or in the field of television. For purposes of expediency the invention as relating to radio will be first considered with reference to Figs. 1 to 4.

Considering Fig. 1, there is shown a radio receiver and distribution system comprising a plurality of differently tuned radio frequency receiver units 11, 12, 13, etc., having a common power supply 15 associated therewith. The receiver units and the common power supply are located at a master or central position. The distribution system also comprises a plurality of audio frequency reproducer units 16, 17, etc., which are located wherever it is desired to reproduce radio programs, such as in different rooms of an apartment house, each of the reproducer units being provided with its own individiual power supply. Single-wire signal conductors 19, 20, 21, etc., lead from the respective receiver units 11, 12, 13, etc., to various portions of the building in which the reproducer units 16 and 17 are located.

Each of the reproducer units is selectively connectable to any one of the main signal conductors 19, 20 and 21 by means of a selector switch located adjacent the reproducer unit and a plurality of branch signal conductors associated therewith. More particularly, the input of the reproducer unit 16 is connected through a coupling condenser 23 to the movable arm 24 of a selector switch 25 which is provided with a plurality of mutually insulated taps 26 to which branch signal conductors 28, 29 and 30 leading from the corresponding signal conductors 19, 20 and 21 are respectively connected. There is one tap for each conductor and an extra, idle tap 27 corresponding to the "off" position of the reproducer. Thus by means of the selector switch 25, the input of the producer unit 16 may be connected through any one of the branch conductors 28, 29, or 30 and the corresponding main signal conductors 19, 20, or 21 to the output of any one of the receiver units 11, 12, or 13 or it may be disconnected from all of them. Similarly, the input of the reproducer unit 17 may be connected, if desired, through a coupling condenser 31 to the output of any one of the receiver units 11, 12 and 13 by means of a selector switch 32 and branch conductors 33, 34 and 35. Other reproducer units may be similarly connected to any one of the receiver units.

In practice the radio receiver units are tuned to receive program signals from different radio stations. With the circuit arrangements of the present invention any number of the reproducer units may be connected in the output of any one of the receiver units and any number of the remaining reproducer units may be connected in the output of any other of the receiver units. In accordance with the present invention each of the radio frequency receiver units includes not only its own tuning element, but also its own volume or gain control element so as to facilitate setting the strength of signals received at the outputs of the respective radio frequency receiver units at substantially the same level. This arrangement facilitates switching any reproducer unit from one station to another without requiring the readjustment of the volume or gain level at that reproducer unit. In addition, each of the reproducer units includes its own volume or gain control so that its output may be set at a level which suits the requirements of the person using that reproducer unit.

Also in accordance with the present invention, a master power switch is arranged at the master location and auxiliary power switches are arranged at the individual locations as will be described in more detail hereinafter. Preferably all the switches are of the single-throw double-pole type having an open and closed position. Each auxiliary power switch controls the energization of the individual reproducer unit with which it is associated. These auxiliary switches are so interlocked with the master switch that they are effective for energizing their respective reproducer units only if the master power switch is in its operating position, so that all the reproducer units may be turned off by manipulation of the master power switch. Also, the auxiliary power switches and the master power switch are so interlocked that the master power supply is energized only if at least one of the individual power switches as well as the master power switch is in its operating position.

Considering in detail the switching arrangement for controlling the distribution of electric power to the master power supply associated with the receiver units and the individual power supplies associated with the respective reproducer units, it is to be noted that the master power supply 15 is provided with an input transformer 38 and that the power supplies of the individual reproducer units 16 and 17 are provided with input transformers 39 and 40, respectively. There is a master control switch 41 associated with the transformer 38 and there are auxiliary control switches 42 and 43 associated with the input transformers 39 and 40, respectively, of the reproducer units. The transformers 38, 39 and 40 and the switches 41, 42 and 43 are interconnected by means of power conductors 45, 46 and 47. Power is supplied from a source 48 through main lines 49 and 50 to two contacts 51 and 52 of the master control switch 41. The first contact 51 is in series with one input lead of the transformer 38 and with conductor 45 and the other contact 52 is in series with the power conductor 46 and all of the contacts of the auxiliary switches 42 and 43.

By closing the master switch 41, the contacts of the auxiliary switches 42 and 43 are connected through the conductor 46 and the contact 52 and through the line 50 to the power source 48, and one end of the transformer 38 is connected through the contact 51 and through the other main line 49 to the power source, in this way preparing all the power supplies for energization. The auxiliary switch 42 associated with the first reproducer unit 16 is provided with a first contact 55 which when closed connects the conductor 46 to one end of the input transformer 39, and is provided with a second contact 56 which when closed connects the conductor 46 through the conductor 47 to the other side of the transformer 38 of the master power supply 15. The other end of the transformer 39 is connected through the conductor 45 and contact 51 and the main line 49 to the power source 48. Similarly the auxiliary switch 43 in the second reproducer unit 17 is provided with its own contacts 57 and 58 similarly connected and arranged with respect to the transformer 40 and the same power conductors 45, 46 and 47.

In operating the power switches 41, 42 and 43 it will be apparent that none of the power supplies may be energized unless the master control switch 41 is closed, and that if this switch is closed, then both the master power supply and any one of the power supplies associated with the respective reproducer units may be energized by closing the auxiliary switch associated with that reproducer unit. In this connection, it is to be noted particularly that the second contacts 56 and 58 of the respective auxiliary switches 42 and 43 which are used to complete the energization of the transformer 38 of the master power supply are connected in parallel between the two power conductors 46 and 47. Also, it is to be noted particularly that the first contacts 55 and 57 of the auxiliary switches 42 and 43 are connected in series with the respective transformers 39 and 40 associated therewith between the two power conductors 45 and 46.

The circuit arrangement of these contacts and the transformers causes the master power supply 15 to remain energized as long as the master switch 41 is closed and any number of the auxiliary switches 42 and 43 are closed. However, the master power supply 15 is deenergized when all of the auxiliary switches 42 and 43 are open. It will also be noted that even though any number of the auxiliary switches 42 and 43 are closed, all the reproducer units and the radio frequency receiver units may be deenergized by opening the master switch 41. This arrangement is of particular advantage in hotels and apartment houses where it is desired to prevent tenants from operating reproducer units between certain hours to the annoyance of their neighbors. Another advantage of this circuit arrangement resides in the fact that the master power supply 15 and the receiver units 11, 12, and 13 do not consume power unless at least one of the reproducer units is operating, thus resulting in a lengthening of the lives of these units.

Figures 2, 3, 4:
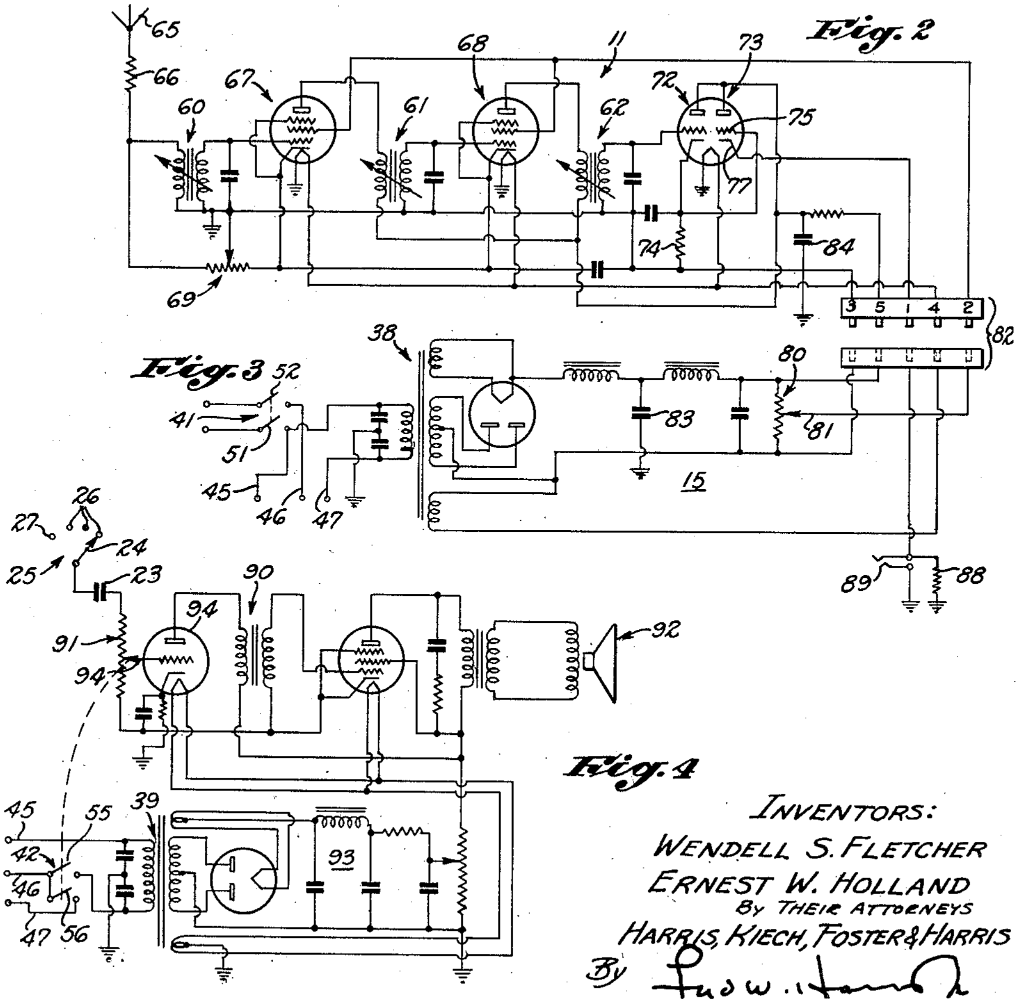
Fig. 2 is a schematic diagram of one of the radio frequency receiver units of a radio system.
Fig. 3 is a schematic diagram of the master power supply.
Fig. 4 is a schematic diagram of one of the audio frequency reproducer units of a radio system.

Referring to Fig. 2, and considering now the circuit arrangement of one of the individual receiver units 11, 12, and 13 in detail, it is to be noted that the receiver unit 11 comprises a two-stage radio receiver amplifier including three adjustable, iron-core radio frequency input transformers 60, 61 and 62 which are tuned to the frequency of a station which that particular receiver unit is to receive. The input transformer 60 is connected to an aerial 65 through a decoupling resistor 66. The first two successive transformers 60 and 61 are interconnected by means of an amplifier tube 67 and the second two successive transformers 61 and 62 are interconnected by means of an amplifying tube 68. The level of signals appearing in the output of the amplifier is controlled by means of an individual volume or gain control 69 including a resistor having a portion which is connected across the input of the input transformer 60, the remainder of this resistor being connected in the cathode circuits of the two amplifier tubes 67 and 68 by means of a grounded, movable contact. Movement of this contact serves to vary the strength of signals impressed upon the input transformer 60 and at the same time serves to vary the bias on the cathodes of the two amplifying tubes 67 and 68 so that when the strength of signals impressed upon the input transformer 60 is reduced, the amplification factor of the two amplifying tubes is likewise reduced, and when the strength of signals impressed upon the input transformer 60 is increased, the amplification factor of the tubes is likewise increased.

Amplified radio frequency signals in the output of the amplifier are then impressed upon a rectifier comprising the left triode section 72, as viewed in the drawing, of a duo-triode tube 73 so as to produce audio frequency signals across a resistor-condenser network 74, this network being connected in the grid circuit of the right triode 75, as viewed in Fig. 2, of the duo-triode tube. The section 75 serves as a cathode follower tube, the output signals of the entire radio frequency unit appearing between ground and the cathode 77 of this tube. The other receiver units 12 and 13 are of similar construction, each including its own tuned radio frequency amplifier, its own volume control element, its own detector tube, and its own cathode follower tube. It is also to be noted that two triode tubes may be used in place of the single duo-triode tube 73, if desired.

Considering now the power supply 15 associated with the receiver units 11, 12 and 13 and referring to Fig. 3, it will be noted that this power supply comprises a rectifier of conventional design and is provided with a voltage divider 80 at its output. The voltage divider 80 is adapted to be connected between ground and the plates of the amplfying tubes 67 and 68 and the plates of the duo-triode tube 73 of each of the radio receiver units. A movable contact 81 between the ends of the voltage divider is adapted to be connected to the screen grids of the amplifying tubes 67 and 68 of the receiver units 11, 12 and 13. The connections of the power supply 15 are made to the various elements of the respective receiver unit through multiple contact plugs 82, a plurality of such plugs of the female type being connected in parallel relation to the various portions of the power supply 15, and corresponding plugs of the male type being connected to various elements of the respective receiver units so that each receiver unit may be independently connected or disconnected to the power supply to facilitate replacement or servicing of any of the receiver units.

Although the power supply 15 is provided with a filter 83, each of the radio receiver units is preferably provided with an auxiliary filter 84 of the resistor-capacitor type in the plate circuits of the tubes 67, 68 and 73 in order to de-couple the tubes in the respective receiver units from each other.

The plugs 82 also include suitable contacts for connecting the cathode 77 of the duo-triode tube 73 to a grounded current carrying load resistor 88 which furnishes bias to the cathode. At the un-grounded end of the resistor 88, there is a single contact phonojack 89 into which the single signal conductor 19 may be plugged. By virtue of the fact that the output of each radio receiver unit is thus in the output of a cathode follower tube, it is apparent that the effective output of each radio receiver unit is very low so that a large number of audio frequency reproducer units may be connected thereto in parallel without appreciably affecting the voltage level of the output signal. Thus, by virtue of this arrangement any number of reproducer units of the voltage amplifying type may be connected in parallel across the output of any receiver unit without affecting the signal level appearing in the output of other reproducer units.

Referring to Fig. 4 and considering now the circuit arrangement of one of the reproducer units, such as the unit 16, in detail, it will be noted that such a reproducer unit includes a two-stage audio frequency amplifier 90 having a volume or gain control resistor 91 shunting its input and a loud speaker 92 connected in its output. Each reproducer unit also includes a power supply 93 in the form of a rectifier having an input transformer 39 or 40 as hereinbefore mentioned. The rectified output appearing at the output of the power supply 93 is applied in conventional manner to the amplifier tubes of the audio frequency amplifier 90. More particularly, the movable contact 24 of the selector switch 25 is connected through the coupling condenser 23 to the volume resistor 91. The movable arm 94 of the volume or gain control 91 is ganged with the contacts 55 and 56 of the auxiliary switch 42 so that these contacts open when the movable arm 94 is moved to the zero, or low gain, position and are closed when this movable arm is moved away from the zero, or low gain, position. Thus, the auxiliary switch 42 is operated by movement of the arm 94 of the volume control 91 to control the energization of both the individual reproducer unit with which the volume control is associated and the master power supply 15. The input impedance represented by the volume control 91 of each reproducer unit is relatively large to facilitate connection of any number of the reproducer units to any one of the receiver units without affecting the output of the different reproducer units.

By virtue of the fact that a cathode follower tube is used in the output of each of the receiver units, it is possible to feed the audio frequency output from any of the receiver units to any number of the reproducer units through inexpensive shielded single signal conductors over great distances without frequency distortion and to use the common ground connection to which all of the electrical units are connected, such as a common water supply pipe, as the return conductor. In practice the power conductors 45, 46 and 47 are run in the same conduit with the shielded signal leads 19, 20 and 21 without introducing any substantial amount of power frequency hum.

The above description has been directed to embodiments for a plurality of radio receivers and a plurality of connected sound reproducers. The following description will be directed to the application of the herein-described invention to television program distribution by means of a plurality of television receivers and connected television reproducers. It is to be recognized in the discussion of television that program presentation entails both visual and sound reproduction. For purposes of expediency, therefore, whenever the term "reproducer" is used herein with respect to television it will be deemed to include both phases of reproduction unless qualified by appropriate terms.

In conventional television, the radio frequencies for transmission of the video or picture carrier and the audio or sound carrier are in spaced side-by-side relationship and within a fixed frequency band width. The picture and sound carriers could be received individually and separately channeled through individual networks; or the carriers may be separated after reception by the antenna, and each signal filtered, connected and amplified by means of a separate network; or the two carriers could be carried through a common network and separation effected when expedient. This distinction is made as it is contemplated that the invention is equally adaptable to any form of television receiver and reproducer, Figs. 1 and 5 being representative and illustrative of several of these forms of a television program distribution system embodying the present invention.

Figures 5, 6, 7:
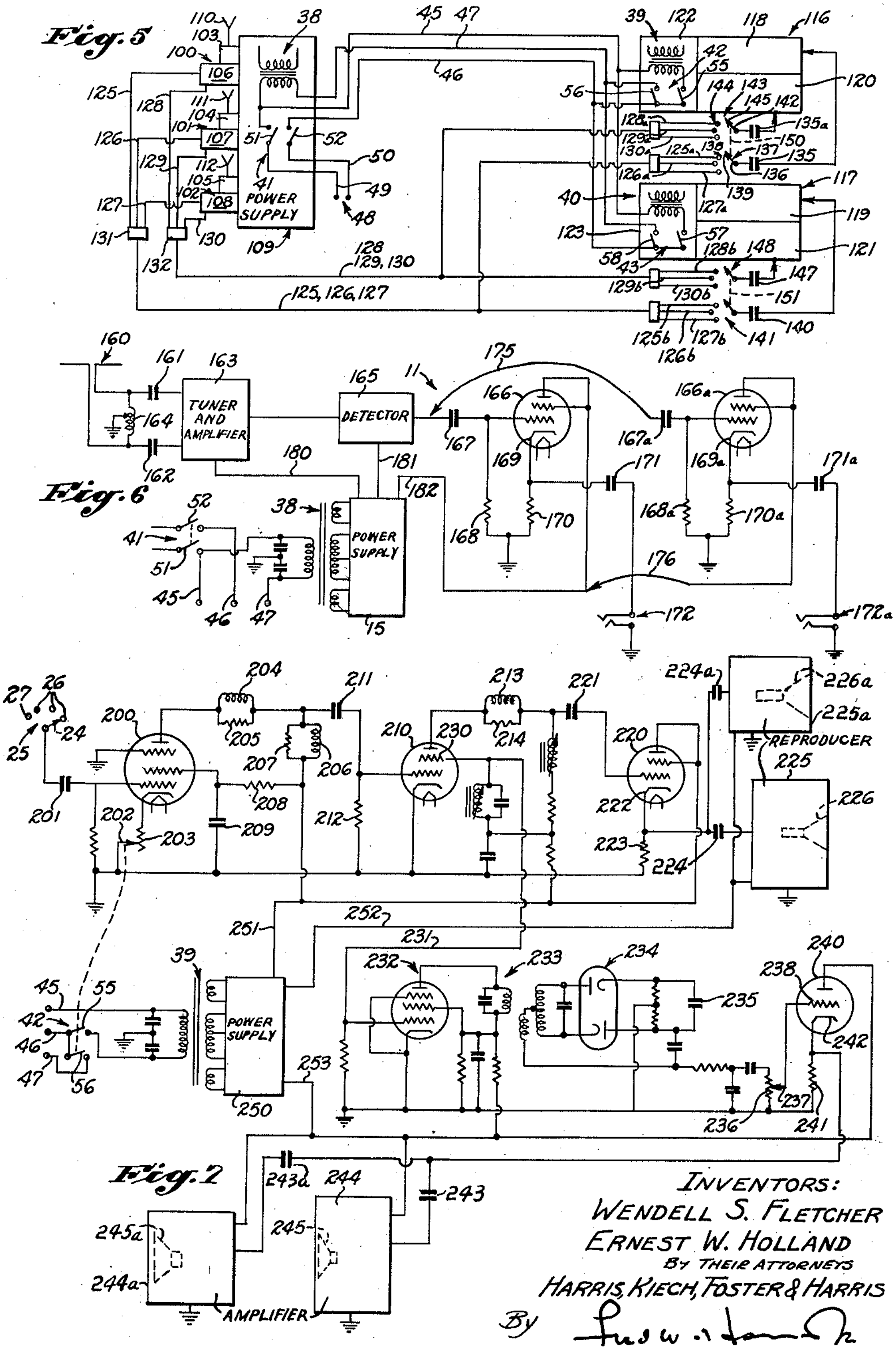
Fig. 5 is a schematic diagram of an alternative form of multiple television receiver and program distribution system.
Fig. 6 is a schematic diagram of one of the radio frequency receiver units of a television system including the master power supply in semi-schematic.
Fig. 7 is a semi-schematic diagram of one of the sound and visual reproducer units of a television system.

More particularly, Fig. 1 is representative of a plurality of picture or video receivers and reproducers, absent the sound or audio receivers and reproducers; and it is also representative of a plurality of sound or audio receivers and reproducers, absent the picture or video receivers and reproducers; and it is also representative of a plurality of both picture and sound receivers and reproducers, whereby the receivers 11, 12 and 13 are common to both the audio and video channels and having a single connection 19, 20, and 21, respectively, leading from each receiver for selective connection with any of the reproducers 16, 17, etc., the segregation of the audio and the video channels for individual presentation being conveniently accomplished within the reproducer units 16, 17, etc. In this latter system, even though there is provided a dual presentation, only a single connection is provided intermediate each receiver to any reproducer. Fig. 5 is representative of a system of television program distribution whereby the audio and video channels are segregated at the receiver and the signals are individually directed to each and every reproducer.

Referring to Fig. 5, there is illustrated a television receiver and program distribution system indicative of one of the forms mentioned above wherein the picture and sound signals are received by a single antenna and then are separated, each signal being appropriately filtered, converted and amplified by separate networks, but having power supplies common to the visual and sound reproducers. This form of system comprises a plurality of differently tuned radio frequency receiver units 100, 101, 102, etc., consisting of radio frequency tuners 103, 104, 105, etc., and radio frequency amplifiers and detectors 106, 107, 108, etc., respectively; all having a common power supply 109 associated therewith. The receiver units and the common power supply are located at a master or central position and each receiver unit may be provided with an antenna 110, 111, 112, etc., of proper design connected thereto to assure sufficient signal strength.

The distribution system also comprises a plurality of reproducer units 116, 117, etc., wherever it is desirable to reproduce visual and associated sound programs. Each reproducer is comprised of a visual reproducer 118, 119, etc., a sound reproducer 120, 121, etc., and a power supply 122, 123, etc., respectively.

Each of the receiver units 100, 101, 102, etc., provides therein for the separation of the audio or sound signal from the video or picture signal. Single-wire signal conductors 125, 126, 127, etc., lead the video signal from the respective receiver units 100, 101, 102, etc., to various portions of the building in which the reproducer units 116, 117, etc., are located. Similarly, single-wire signal conductors 128, 129, 130, etc., lead the audio signals from the respective receiver units to the reproducer units. For schematic convenience, the conductors are illustrated individually and then joined in cable form as indicated at numerals 131 and 132.

Each of the visual reproducer units is selectively connectable to any one of the video signal conductors 125, 126, and 127 by means of a selector switch located adjacent the reproducer unit and a plurality of branch signal conductors associated therewith. More particularly, the input of the visual reproducer unit 118 is connected through a coupling condenser 135 to the movable arm 136 of a selector switch 137 which is provided with a plurality of insulated taps 138 to which branch signal conductors 125*a*, 126*a* and 127*a* are respectively connected. There is one tap for each conductor and an extra, idle tap 139 corresponding of the "off" position of the reproducer. Thus by means of the selector switch 137, the input of the visual reproducer unit 118 may be connected through any one of the branch conductors 125*a*, 126*a*, or 127*a* to the video output of any one of the receiver units 100, 101, or 102, or it may be disconnected from all of them. In like manner, the input of the visual reproducer 119 may be connected through a coupling condenser 140 to the video output of any one of the receiver units 100, 101, or 102 by means of a selector switch 141 and branch conductors 125*b*, 126*b*, and 127*b*. Other visual reproducer units may be connected as described above to any one of the receiver units.

Similarly, each of the audio reproducer units is selectively connectable to any one of the audio signal conductors 128, 129 and 130 by means of the following described selector switch located adjacent the reproducer unit and a plurality of branch signal conductors associated therewith. More particularly, the input of the audio reproducer unit 120 is connected through a coupling condenser 135*a* to the movable arm 142 of a selector switch 143 which is provided with a plurality of insulated taps 144 to which branch signal conductors 128*a*, 129*a* and 130*a* are respectively connected. There is a tap for each conductor and an extra, idle tap 145 corresponding to the "off" position of the reproducer. Thus by means of the selector switch 143, the input of the audio reproducer unit 120 may be connected through any one of the branch signal conductors 128*a*, 129*a* or 130*a* to the audio output of any one of the receiver units 100, 101, or 102, or may be disconnected from all of them. In like manner, the input of the audio reproducer 121 may be connected through a coupling condenser 147 through the audio output of any one of the receivers 100, 101, or 102 by means of a selector switch 148 and branch conductors 128*b*, 129*b* and 130*b*. Other audio reproducer units may be connected as above described to any one of the receiver units. To maintain synchronism between the visual and sound presentation, the selector switches 137 and 143, and 141 and 148 may be ganged together as indicated at 150 and 151, respectively, for simultaneous operation thereof.

The means whereby the power is supplied to the receiver units 100, 101 and 102 and reproducers 116 and 117 is the same as heretofore described with respect to Fig. 1. Since the power circuit is disassociated from the signal carriers, the numerals of Fig. 1, directed to the power switching arrangement, are duplicated upon Fig. 5 and operate in the same manner as hereinbefore described.

Referring again to Fig. 1 which has heretofore been described as relating to a system adapted for radio program distribution, it is equally adaptable for distribution of the audio or sound portion of a television program. Further, it is equally adaptable for distribution of the video or picture portion of a television program. More particularly, it is adaptable for distribution of both sound and video distribution whereby duplication of certain electrical networks may be eliminated as well as providing a single-wire signal conductor intermediate each receiver and any reproducer. This latter distribution system will be described in detail hereinbelow.

Referring to Fig. 1, therefore, the receiver units 11, 12, and 13 are individual receiver units for television communication, the components of each of which are illustrated in Fig. 6. Similarly, the reproducer units 16 and 17 are individual reproducer units for television reproduction, the components of which are illustrated in Fig. 7.

The television receiver unit illustrated in Fig. 6 comprises an antenna 160 that is connected through antenna isolating condensers 161 and 162 to a radio frequency tuner and amplifier 163 which is tuned to the channel or frequency which that particular receiver unit is to receive. Bridged across the leads to the antenna 160 is a coil 164 which is center-tapped to ground which serves to prevent undesirable low-frequency signals from reaching the grid of the radio frequency amplifier 163. The output of the tuner and amplifier 163 is connected to a conventional intercarrier and intermediate frequency amplifier and detector 165, which includes a volume or gain control whereby the intensity of the signal may be controlled within the receiver unit. The output of the amplifier and detector 165 is impressed upon a cathode follower tube 166 through a coupling condenser 167, being appropriately biased by a grid biasing resistor 168, so as to provide video frequency signals and sound frequency modulated signals between a cathode 169 of the tube 166 and ground as determined by a cathode resistor 170. The composite signal appearing across the cathode resistor 170 is connected through a coupling condenser 171 and to a suitable outlet as indicated by a phono-jack 172 for appropriate distribution as will hereinafter be described.

If circumstances require, the television receiver unit 11 may be equipped with a plurality of cathode follower tubes, such as tube 166, including appropriate network connections. Exemplary of the manner in which this may be accomplished is a cathode follower tube **166*a* and the elements and connections thereto, all of which are similar to the network connecting tube 166. The operation of the tube 166*a* is the same as the tube 166, and accordingly the numerals identifying the elements relating to the tube 166*a* are the same as those relating to the tube 166**, but each appropriately identified by the suffix "*a*." The cathode follower tube **166*a* may be connected or disconnected from the television receiver unit 11 by leads 175 and 176** as indicated by the arrows thereon in any conventional switching manner.

Particularly noteworthy in the connection of the cathode follower tubes 166 and **166*a* is the fact that any number of such tubes may be connected in parallel without appreciable effect upon the function of the preceding network components, whereby additional television reproducers may be connected and provided with signals from the receiver unit 11**.

Considering now the power supply associated with the television receivers 11, 12, and 13, it is similar in all material respects to the power supply 15 and the input connections thereto heretofore described with relation to Figs. 1 and 2. Accordingly, for expediency, the same numerals are used thereon in Fig. 6 as were heretofore used in Fig. 2 and the operation thereof may be regarded the same as hereinbefore described. The connections to the power supply 15, namely, connections 180, 181 and 182, supply voltage to the tuner and amplifier 163, the amplifier and detector 165, and the cathode follower tubes 166, **166*a***, etc., respectively.

The phono-jack 172 is arranged to receive one of the single signal wire conductors, in this instance conductor 19, for connection to any or all of the television reproducers 16, 17, etc. By virtue of the fact that the output of each television receiver unit is the output of a cathode follower tube, the effective output of each television receiver unit is very low so that a large number of television reproducer units may be connected thereto in parallel without appreciably affecting the voltage level of the output signal. Accordingly, any number of television reproducer units may be connected in parallel without affecting the signal level of either the picture or sound presentation appearing in the output of the television reproducer units.

Referring to Fig. 7 and considering now one of the television reproducer units, for example, the unit 16, connection to one of the television receiver units, such as unit 11, is made by means of the single signal wire conductor 19 intermediate the phono-jack 172 of the unit 11 and the switch 25 of the unit 16. Considering the circuit arrangement in detail, the signal lead from the switch 25 is connected to the grid of an amplifier tube 200 through a coupling condenser 201 whereby the signal is amplified, the strength thereof being controlled by a movable tap 202 of a cathode biasing resistor 203 which serves as a variable contrast or gain control for the television picture intelligence. The output of the tube 200 is provided with an inductance 204 to improve high frequency response, a shunting resistor 205 to minimize any sharp increase in circuit response that may be due to the combination of the inductance 204 and its natural inherent capacitance, a plate choke 206 across a plate resistor 207 which improves the phase angle response of the network, a dropping resistor 208 through which voltage is applied to the screen grid of the tube 200, and a condenser 209 which serves to by-pass any undesirable alternating frequency that otherwise would appear on the screen grid and interfere with the signal being amplified.

The amplified signal is directed to a next amplifying tube 210 through a coupling condenser 211, and appropriately biased by a grid biasing resistor 212, whereby the signal is further amplified. The output of the tube 210 is provided with an inductance 213 and a shunting resistor 214 which serve a similar function as inductance 204 and resistor 205. The output signal of the amplifying tube 210 is directed to a video cathode follower tube 220 through a coupling condenser 221 whereby a voltage is caused to appear between the cathode 222 of the tube 220 and the ground and across a cathode resistor 223, which voltage is proportional to and in phase with the input signal to the tube 220. This voltage appearing across the resistor 223 is applied through a coupling condenser 224 and through the conventional last stages of a video or picture reproducer unit which is represented by the numeral 225, the components of which include, among others, any desired additional video amplifiers, D. C. restoration circuit, and a cathode-ray tube which is indicated by the numeral 226.

By virtue of the fact that the video signal voltage is caused to appear across the cathode resistor 223 of the cathode follower tube 220, additional last stages of picture reproducers **225*a* may be connected in parallel across the resistor 223 without appreciable effect upon the voltage level, whereby a plurality of cathode-ray tubes 226*a*** may be selectively connected or disconnected therefrom without appreciably affecting the voltage level input of other cathode-ray tubes that may be already connected.

Considering now the sound channel, the separation of the sound signal from the video signal occurs at a screen grid 230 of the tube 210, the signal being applied through a conductor 231 to a conventional audio limiter network 232. The output of the limiter 232 appears across a resonant circuit 233 which is inductively coupled to the input of a conventional frequency modulation ratio detector 234 whereby the audio signal voltage is caused to appear across a condenser 235. This audio signal voltage is impressed across a potentiometer 236 having a variable tap 237 thereon whereby any portion of the voltage may be impressed upon a grid 238 of an audio cathode follower tube 240. A cathode resistor 241 is provided between a cathode 242 of the tube 240 and ground, the voltage appearing thereacross being proportional to the input voltage to the tube 240, which voltage is applied through a coupling condenser 243 to an audio amplifier 244 including a speaker 245.

Additional audio amplifiers **244*a* and associated speakers 245*a* may be connected in parallel to or disconnected from the cathode resistor 241** and, due to its low impedance, the output of any amplifier and speaker that already may be connected is not appreciably affected.

Manual movement of the variable tap of the potentiometer 236 provides a means whereby the volume or gain of the amplifier 244 may be controlled.

Considering now the power supply that is associated with the reproducer units 16, 17, etc., it is generally designated by the numeral 250 and is similar in all material respects to the arrangement heretofore described with relation to Fig. 4. Accordingly, for expediency, the same numerals are used thereon in Fig. 7 as were heretofore used in Fig. 4, and the operation may be regarded as the same as hereinbefore described. Specifically, however, the movable arm 202 of the volume or gain control resistor 203 is ganged with the contacts 55 and 56 of the auxiliary switch 42 so that these contacts open when the arm 202 is moved to the zero, or low gain, position and are closed when this arm is moved away from the zero, or low gain, position. Thus the auxiliary switch 42 in this instance is operated by movement of the volume or gain control to control the energization of both the individual reproducer units with which the volume or gain control is associated and the master power supply 15.

The power supply connections leading from the supply 250 in this instance serve to provide D. C. voltage to the tubes 200, 210 and 220 by a conductor 251; to the network 225 of the picture reproducer which also includes the conventional sweep circuits, hi-voltage sources, etc., by a conductor 252; and to the audio limiter 232, detector 234, cathode follower tube 240 and audio amplifier 245 by a conductor 253.

From the foregoing description of this invention it will be clear that we have provided a novel communication-receiver system, and specifically a multiple unit radio and/or television receiving and program distribution system in which it is possible to connect any number of reproducer units to any one of the program receiving units without disturbing or inconveniencing another party who has already connected a reproducer unit to the same receiver unit. It will also be clear that we have provided an improved circuit arrangement for controlling distribution of program signals from a master location to any number of listening and/or viewing locations. And it will also be clear that there has been provided an improved power supply system in which the application of power may be controlled from both the master location at which the receiver units are located and the listening and/or viewing locations at which the reproducer units are located.

It is, of course, to be understood that although certain preferred embodiments have been described in detail herein, our invention is not to be limited to the specific embodiments described since various modifications thereof are possible without departing from the spirit of the invention. It is therefore intended to cover all such modifications as come within the scope of our appended claims.

It is to be understood that the term "radio frequency" as used in the appended claims is generic to electromagnetic waves for any type of space wave radiation, the preferred embodiments described herein being directed to radio and television as these terms are presently understood.

We claim as our invention:

1. A radio frequency system including: a radio frequency amplifier; a plurality of amplifiers; means for selectively connecting any number of said amplifiers to said radio frequency amplifier; a first power supply operatively connected to said radio frequency amplifier; a plurality of second power supplies operatively connected to said amplifiers, respectively; a master switch having an operative position in which said first power supply and said second power supplies are prepared for energization, and having a disconnect position in which said first power supply and said second power supplies are deenergized; and a plurality of individual switches respectively in circuit with said second power supplies, each of said individual switches including means operative when said master switch is in its operative position for completing the energization of said first power supply and the energization of the second power supply with which said each individual switch is in circuit.

2. A radio frequency system including: a radio frequency amplifier; a plurality of amplifiers each having a movable control means for varying the gain thereof; means for selectively connecting any number of said amplifiers to said radio frequency amplifier; a first power supply operatively connected to said radio frequency amplifier; a plurality of second power supplies operatively connected to said amplifiers, respectively; a master switch having an operative position in which said first power supply and said second power supplies are prepared for energization, and a disconnect position in which said first power supply and said second power supplies are deenergized; and a plurality of individual "on-off" switches controlled by movement of the respective control means, each of said individual "on-off" switches including movable means, operative when said master switch is in its operative position, for completing the energization of said first power supply and the energization of the second power supply with which said each individual switch is associated.

3. A multiple unit radio frequency receiver including: a radio frequency amplifier; a plurality of amplifiers; means for selectively connecting any number of said amplifiers to said radio frequency amplifier; a first power supply operatively connected to said radio frequency amplifier; a plurality of second power supplies operatively connected to said amplifiers, respectively; a plurality of individual switches in circuit with said second power supplies, respectively, each of said individual switches being operative to energize said first power supply and the second power supply with which each is associated; and a master switch electrically interconnected with said individual switches for deenergizing all of said power supplies irrespective of the settings of the individual switches.

4. A radio frequency receiver system including: a radio frequency amplifier; a plurality of amplifiers; means for selectively connecting any number of said amplifiers to said radio frequency amplifier; a first power supply operatively connected to said radio frequency amplifier and having first and second power input leads; a plurality of second power supplies operatively connected to said amplifiers, respectively, each second power supply having its own third and fourth power input leads; a master switch having first and second contacts which are jointly movable between open and closed positions, said first contact being connected in circuit with said first power input lead and all of said fourth power input leads, and said second contact being connected in circuit with said second power input lead and with all of said third power input leads; and a plurality of individual switches, each of said individual switches including first and second contacts which are jointly movable between open and closed positions, said first contact of each individual switch being connected in circuit with the third power input lead of one of the second power supplies and said second contact of each individual switch being connected in circuit with said second power input lead.

5. A radio frequency receiver system including: a radio frequency receiver unit at a master location; a plurality of amplifiers disposed at spaced locations; means for connecting any number of said amplifiers to said radio frequency receiver unit; a first power supply operatively connected to said radio frequency receiver unit and having first and second power input leads; a second power supply operatively connected to each of said amplifiers, each of said second power supplies having its own third and fourth power input leads; a first switch contact connected in circuit with said first lead and all of said fourth leads; a second switch contact connected in circuit with said second lead and all of said third leads; and a plurality of switches each having a third and fourth contacts, each third contact being connected in circuit with the third power input lead of one of the second power supplies, and the fourth contacts being connected in series with said second lead.

6. In a system of the character described, the combination of: a radio frequency receiver having a power supply; a plurality of reproducers each having a power supply; means for selectively connecting said reproducers in the output of said receiver; and power circuit means including switch means in circuit with said receiver and said reproducers for energizing said receiver and for selectively energizing said reproducers, said switch means including a plurality of switches each having a pair of contacts, the contacts of each pair being operable for movement in unison and one of the contacts of each pair being connected in series with said receiver power supply, the other contacts of said pairs being connected in series with said reproducer power supplies, respectively, said switch means also including a master switch connected in series with said receiver power supply and in series with said reproducer power supplies.

7. In combination: a radio frequency signal receiver having signal output means and first power input means; a signal reproducer having signal input means and second power input means; means for connecting said signal input means to said signal output means; means for connecting said first and second power input means in parallel; a first switch in series with said first power input means; a second switch in series with said second power input means and in parallel with said first switch, said first switch being operable with said second switch for movement to open and closed positions in unison therewith; and a master switch connected in series with said first power input means and in series with said second power input means.

8. A combination as set forth in claim 7 including a third switch in series with said first switch and said second switch.

9. In combination: a radio frequency signal receiver having signal output means and first power input means; a plurality of signal reproducers each having signal input means and second power input means; means for selectively connecting any number of said signal input means to said signal output means; means for connecting said first power input means and all of said second power input means in parallel; a plurality of first switches in series with said first power input means and in parallel with each other; a plurality of second switches in series with said second power input means, respectively, and in parallel with each other, said second switches being in parallel with said first switches and each of said second switches being operable with one of said first switches for movement to open and closed positions in unison therewith; and a master switch connected in series with said first power input means and in series with each of said second power input means.

References Cited in the file of this patent

UNITED STATES PATENTS

| | | |
|---|---|---|
| 348,155 | Dyer | Aug. 24, 1886 |
| 1,623,480 | Kuhn | Apr. 5, 1927 |
| 1,658,825 | Wolf et al. | Feb. 14, 1928 |
| 1,754,878 | Clement | Apr. 15, 1930 |
| 1,845,302 | Luellen | Feb. 16, 1932 |
| 1,968,546 | Van Dyck | July 31, 1934 |
| 2,110,358 | Dreisbach | Mar. 8, 1938 |
| 2,279,739 | Lurie | Apr. 14, 1942 |
| 2,324,279 | Clark | July 13, 1943 |
| 2,330,109 | Brown | Sept. 21, 1943 |
| 2,366,358 | Schlesinger | Jan. 2, 1945 |
| 2,398,771 | Compton | Apr. 23, 1946 |
| 2,431,973 | White | Dec. 2, 1947 |
| 2,523,173 | Winters | Sept. 19, 1950 |
| 2,567,276 | Dicke | Sept. 11, 1951 |